United States Patent
Seong

(10) Patent No.: US 7,843,708 B2
(45) Date of Patent: Nov. 30, 2010

(54) SYNCHRONOUS RECTIFIER TYPE SERIES RESONANT CONVERTER FOR OPERATING IN INTERMITTENCE MODE

(75) Inventor: Hwanho Seong, Gunpo-si (KR)

(73) Assignee: PSTEK Co. Ltd., Ansan (KR)

( * ) Notice: Subject to any disclaimer, the term of this patent is extended or adjusted under 35 U.S.C. 154(b) by 354 days.

(21) Appl. No.: 11/912,744

(22) PCT Filed: May 18, 2006

(86) PCT No.: PCT/KR2006/001862

§ 371 (c)(1),
(2), (4) Date: Oct. 26, 2007

(87) PCT Pub. No.: WO2006/123905

PCT Pub. Date: Nov. 23, 2006

(65) Prior Publication Data

US 2008/0186742 A1    Aug. 7, 2008

(30) Foreign Application Priority Data

May 18, 2005    (KR) .................. 10-2005-0041829

(51) Int. Cl.
*H02M 3/335* (2006.01)
*H02M 7/217* (2006.01)

(52) U.S. Cl. ................ 363/21.02; 363/21.06; 363/127

(58) Field of Classification Search .............. 363/20, 363/21.01, 21.02, 21.03, 21.06, 21.14, 127, 363/17

See application file for complete search history.

(56) References Cited

U.S. PATENT DOCUMENTS

| | | | |
|---|---|---|---|
| 4,727,469 A * | 2/1988 | Kammiller | 363/56.02 |
| 6,301,128 B1 * | 10/2001 | Jang et al. | 363/17 |
| 6,324,080 B1 * | 11/2001 | Laeuffer | 363/25 |
| 6,344,979 B1 * | 2/2002 | Huang et al. | 363/16 |

FOREIGN PATENT DOCUMENTS

| | | |
|---|---|---|
| JP | 11-332233 | 11/1999 |
| JP | P2004-343966 | 12/2004 |
| KR | 2004-0081374 | 9/2004 |

* cited by examiner

*Primary Examiner*—Gary L Laxton
(74) *Attorney, Agent, or Firm*—Lowe Hauptman Ham & Berner LLP

(57) ABSTRACT

A synchronous rectifier type SRC for operating in an intermittence mode, which includes: an input power for supplying an input DC voltage; an input-side switching unit; a transformer with a primary winding and a secondary winding; an output-side switching unit for switching; and a gate driving circuit for detecting. According to the synchronous rectifier type SRC, a no-load characteristic can be controlled with an easy scheme and a simple construction. In addition, a simple resistor is added, and thus dead time can be generated. Consequently, it is possible to simply reduce switching loss that may occur in zero voltage switching.

9 Claims, 7 Drawing Sheets

1A

1B

2A

2B

US 7,843,708 B2

SYNCHRONOUS RECTIFIER TYPE SERIES RESONANT CONVERTER FOR OPERATING IN INTERMITTENCE MODE

CROSS REFERENCE TO RELATED APPLICATION

This application is the National Phase application of International Application No. PCT/KR2006/001862, filed May 18, 2006, which designates the United States and was published in English. This application, in its entirety, is incorporated herein by reference.

TECHNICAL FIELD

The present invention relates to a synchronous rectifier type Series Resonant Converter (hereinafter, referred to as SRC) for operating in an intermittence mode, and more particularly to a synchronous rectifier type SRC for operating in an intermittence mode, in which, in a DC/DC converter for converting DC voltage to DC voltage of a predetermined level, a high frequency rectifier of the DC/DC converter is replaced with a synchronous rectifier, a dead time generator is realized by a simple method in order to reduce the switching loss of the synchronous rectifier, conversion efficiency is maximized in low output voltage, and a series resonant circuit of the DC/DC converter is controlled in the intermittence mode, so that no-load characteristic can be improved, conversion efficiency can be improved, and a manufacturing cost can be reduced.

BACKGROUND ART

Nowadays, there exist various circuits for realizing an isolation DC/DC converter. One of them is an SRC.

FIG. 1 is a diagram illustrating a conventional SRC and a resonant current characteristic curve.

FIG. 1a illustrates the conventional SRC. The conventional SRC uses resonance of an inductor and a capacitor, and shows good conversion efficiency. The conventional SRC includes DC input power 110, four switching devices (Q1 to Q4) 120, an LC resonance circuit 130 comprised of a resonance inductor 132 and a resonance capacitor 134, a transformer 140, a bridge rectification circuit 150, a capacitor 160, and an output terminal 170. The four switching devices 120 alternatively switch the input voltage of the input power 110 to convert the DC voltage to AC voltage, and transfer the AC voltage to the LC resonance circuit 130. The LC resonance circuit 130 changes the frequency characteristic of the received AC voltage. The transformer 140 has a predetermined turn ratio, converts the AC voltage (i.e. primary voltage), which is received from the LC resonance circuit 130, to voltage of a predetermined level, and thus outputs secondary voltage. The bridge rectification circuit 150 rectifies the AC voltage induced at a secondary-side of the transformer 140 into DC voltage. The capacitor 160 filters the rectified DC voltage and the output terminal 170 outputs the filtered DC voltage. Herein, the inductor constituting the LC resonance circuit 130 may also be separately added, but increased leakage inductance of the transformer 140 may also be used.

Hereinafter, a process for performing DC/DC conversion by means of such an SRC will be briefly described. The DC voltage inputted through the input power V is converted to the spherical wave pulse voltage of AC, which has positive voltage and negative voltage alternating with each other, through periodic repetition of a process in which one pair of switching devices Q1 and Q4 are turned on during a half period and the other pair of switching devices Q2 and Q3 are turned on during the other half period.

Then, the spherical wave pulse voltage of AC is transferred to the LC resonance circuit 130 comprised of the resonance inductor 132 and the resonance capacitor 134, and the LC resonance circuit 130 stores and transfers energy.

Herein, the resonance voltage and the resonance current of the LC resonance circuit 130 have amplitudes changing according to frequencies of the applied spherical wave.

The transformer 140 converts input current to output current according to its turn ratio, transfers the output current to a secondary-side. The secondary current of the transformer 140 is rectified to DC through the bridge rectification circuit 150, is filtered by the capacitor 160, and then is outputted as output voltage through the output terminal 170.

Herein, the frequency switched through the afore-described switching devices will be referred to as a switching frequency. As such a switching frequency increases, the sizes of the capacitor 160 for output filtering, the resonance inductor 132, the resonance capacitor 134, etc., can be reduced. Accordingly, it is possible to reduce the size and area of an entire circuit. In the meantime, there exists loss due to overlap of electric current and voltage during an excessive switching interval. Such loss will be referred to as switching loss. As the switching frequency increases, the switching loss also increases and the efficiency of a circuit deteriorates.

FIG. 1b illustrates the characteristic of resonant current Ir according to a switching frequency $F_{sw}$.

If the switching frequency reaches a resonance frequency $$Fr = \frac{1}{2\pi\sqrt{L_r C_r}},$$

the resonant current Ir is maximized. As the switching frequency becomes greater than the resonance frequency, the resonant current Ir is reduced. However, as the switching frequency becomes less than the resonance frequency, the resonant current Ir is reduced. Due to such a characteristic, the conventional SRC controls output by means of a Pulse Frequency Modulation (hereinafter, referred to as PFM) scheme.

However, as it can be understood in the characteristic curve of FIG. 1b, one of the disadvantages of such an SRC lies in that the resonant current does not become zero no matter how the frequency increases. That is, the SRC cannot include a no-load state, in which output current becomes zero during switching, as an operation area. In order to improve control characteristics in such a no-load state, an LLC SRC and an LCC SRC have been mainly used in industrial fields.

FIG. 2 is a circuit diagram illustrating a conventional LLC SRC and LCC SRC for improving a no-load characteristic. FIG. 2a illustrates the conventional LLC SRC, and FIG. 2b illustrates the conventional LCC SRC. As illustrated in FIGS. 2a and 2b, in the LLC SRC, a parallel inductor 210 is added in parallel with the primary winding of the transformer 140. In the LCC SRC, a parallel capacitor 220 is added in parallel with the primary winding of the transformer 140.

In such a case, entire resonance voltage is divided in proportion to impedance of each part. If the primary voltage of the transformer 140 is less than output voltage, output control in a no-load state is possible because a secondary rectifier diode is not turned on.

In the LLC SRC, the parallel inductor 210 is added in parallel with the transformer 140. In the LCC SRC, the parallel capacitor 220 is added in parallel with the transformer 140. Each of the LLC SRC and the LCC SRC has the following advantages and disadvantages.

In an actual the LLC SRC, the leakage inductance of the transformer 140 is used as the resonance inductor $L_r$. Further, a gap is inserted into the core of the transformer 140 and magnetizing inductance thereof is adjusted, so that the parallel inductor 210 is achieved. That is, the LLC SRC is advantageous in that no additional parts exist except for the resonance capacitor 134.

However, since electric current flowing through magnetizing inductance always flows in the primary winding of the transformer 140, the primary winding must be relatively thicker than the secondary winding. Therefore, the size of the transformer 140 increases. That is, primary-secondary winding current is not in proportion to the turn ratio.

In the LCC SRC, if the parallel capacitor 220 is disposed in the secondary winding of the transformer 140, electric current flowing in the parallel capacitor 220 flows in both the primary winding and the secondary winding of the transformer 140. Therefore, the size of the transformer 140 increases as compared with that in the LLC SRC. Accordingly, if the resonance inductor 132 is separately added and the resonance capacitor 134 is disposed in the primary winding, the transformer 140 can be optimally manufactured. However, even in such a case, since the leakage inductance of the transformer 140 is not used, a manufacturing cost may increase.

As described above, the conventional SRC does not show a no-load state, i.e. cannot control output voltage due to abnormal increase in the output voltage. Further, an SRC capable of controlling a no-load state has been currently provided, but the size of a necessary power device may increase and a manufacturing cost may increase. Accordingly, it is necessary to provide an SRC capable of controlling a no-load state even without additional separate parts, and maximizing power conversion efficiency.

DISCLOSURE OF THE INVENTION

Therefore, the present invention has been made in view of the above-mentioned problems, and it is an object of the present invention to provide a synchronous rectifier type SRC for operating in an intermittence mode, in which, in a DC/DC converter for converting DC voltage to DC voltage of a predetermined level, a high frequency rectifier of the DC/DC converter is replaced with a synchronous rectifier, a dead time generator is realized by a simple method in order to reduce the switching loss of the synchronous rectifier, conversion efficiency is maximized in low output voltage, and a series resonant circuit of the DC/DC converter is controlled in the intermittence mode, so that no-load characteristic can be improved, conversion efficiency can be improved, and a manufacturing cost can be reduced.

In order to accomplish this object, according to an aspect of the present invention, A synchronous rectifier type Series Resonant Converter (SRC) for converting input DC voltage to output DC voltage having a level different from that of the input DC voltage, the synchronous rectifier type SRC comprising: an input power for supplying the input DC voltage; an input-side switching unit for switching four input-side switching devices to convert the input DC voltage to AC voltage, the input-side switching unit being connected to the input power; an LC resonance circuit for storing energy in a resonance inductor and a resonance capacitor by means of LC resonance, and outputting resonance voltage, the LC resonance circuit being connected to the input-side switching unit; a transformer with a primary winding and a secondary winding for converting the resonance voltage to voltage of a predetermined level according to a turn ratio to generate secondary voltage, and transferring the secondary voltage through the secondary winding, the primary winding being connected to the LC resonance circuit; an output-side switching unit for switching four output-side switching devices to convert the secondary voltage to the output DC voltage, the output-side switching unit being connected to the secondary winding of the transformer; and a gate driving circuit for detecting a polarity of secondary current flowing in the secondary winding, generating dead time, generating driving signals for driving the output-side switching device of the output-side switching unit according to the polarity, and then controlling turn-on or turn-off of the output-side switching devices, the gate driving circuit being connected to both the secondary winding of the transformer and the output-side switching unit.

According to another aspect of the present invention, there is provided A method for controlling output in a no-load characteristic or a light-load characteristic in a synchronous rectifier type Series Resonant Converter (SRC) for converting input DC voltage to output DC voltage having a level different from that of the input DC voltage by using a switching device and an LC resonance circuit, the method comprising the steps of: switching the switching device by using an intermittence mode; and controlling the output in the no-load characteristic or the light-load characteristic so that electric current inputted to the LC resonance circuit approximates zero, wherein the intermittence mode corresponds to a switching method for operating the switching device by changing at least one of turn-on time, turn-off time and turn-on period of the switching device.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

The configuration of the present invention may include a control method of an SRC for controlling a no-load state, and a realization method of a synchronous rectifier for maximizing power conversion efficiency in a simple manner. For convenience of description, a method for realizing a synchronous rectifier will be described with reference to FIGS. 3 to 6, and then a method for improving the no-load characteristic of an SRC by means of an intermittence mode control scheme will be described with reference to FIG. 7.

Herein, a method for realizing a synchronous rectifier type SRC for improving conversion efficiency of an SRC according to a preferred embodiment of the present invention will be described in detail with reference to FIGS. 3 to 6.

Figure 3:
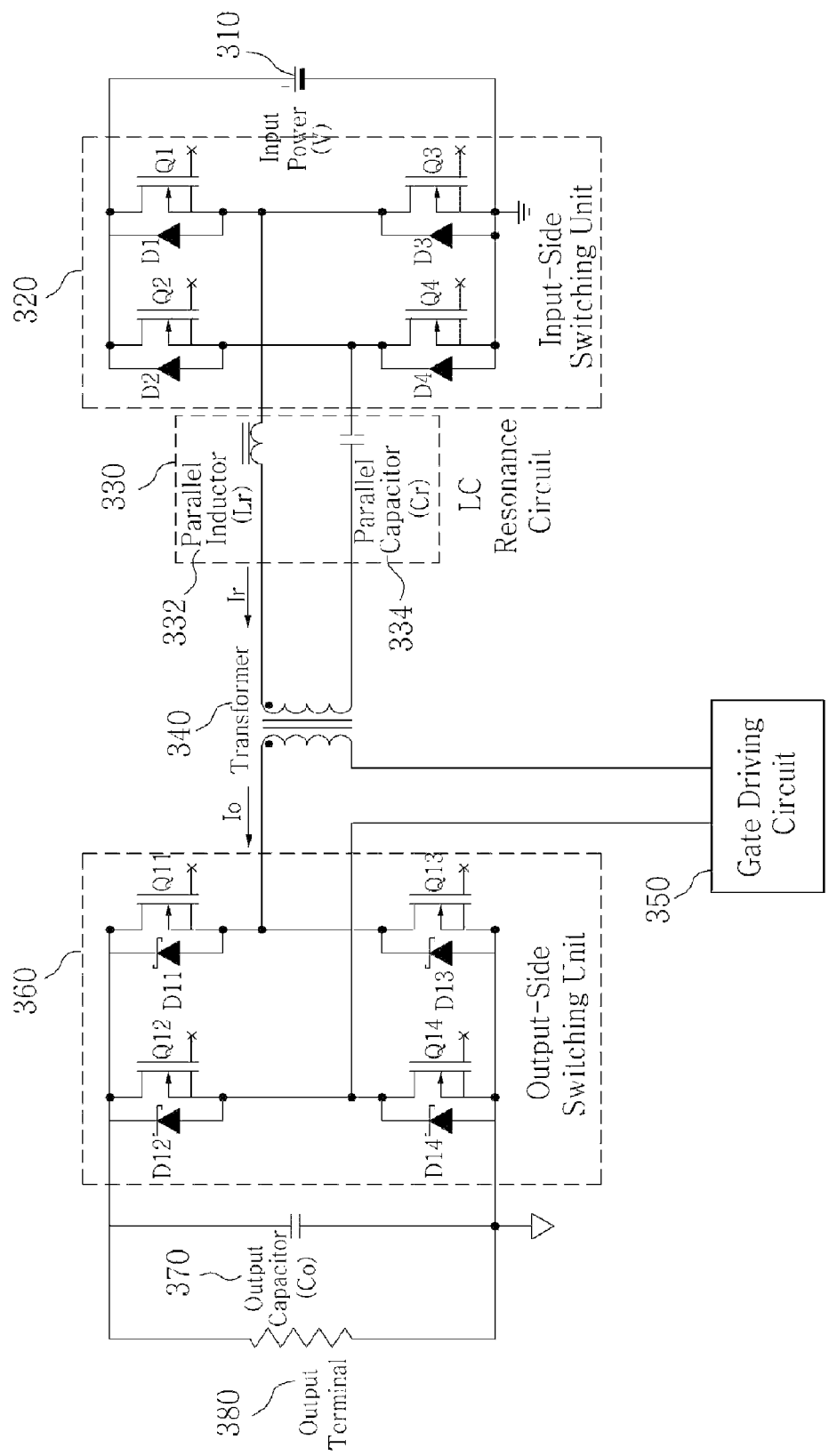
FIG. 3 is a circuit diagram schematically illustrating a synchronous rectifier type SRC according to a preferred embodiment of the present invention.

FIG. 3 is a circuit diagram schematically illustrating a synchronous rectifier type SRC according to a preferred embodiment of the present invention.

Referring to FIG. 3, the synchronous rectifier type SRC includes input power 310, an input-side switching unit 320, an LC resonance circuit 330, a transformer 340, a gate driving circuit 350, an output-side switching unit 360, an output capacitor 370 and an output terminal 380.

The input power 310 is power supply for supplying DC power.

The input-side switching unit 320 includes both four switching devices Q1 to Q4 connected in a full bridge configuration, and input-side body diodes D1 to D4 embedded in each of the switching devices Q1 to Q4. The input-side switching unit 320 performs a switching operation with a period corresponding to an applied frequency, converts DC power, which is transferred from the input power 310, to AC power, and transfers the AC power to the LC resonance circuit 330.

That is, the DC voltage transferred from the input power 310 is converted to voltage of a spherical wave pulse, which alternatively shows positive polarity and negative polarity, through a periodic process in which one pair of switching devices Q1 and Q4 are turned on during a half period and the other pair of switching devices Q2 and Q3 are turned on during the other half period. That is, the secondary current of the transformer 340 flows in the input-side body diodes D1 to D4 embedded in each of the switching devices Q1 to Q4 when each of the switching devices Q1 and Q4 is turned off.

The input-side switching unit 320 includes a gate driving circuit (not shown) for driving the switching devices Q1 and Q4 in order to cause one pair of switching devices Q1 and Q4 to be turned on during the half period and cause the other pair of switching devices Q2 and Q3 to be turned on during the other half period. Since the gate driving circuit is a conventional gate driving circuit, and is well known to those skilled in the art, details will be omitted. Further, the gate driving circuit is used for switching for an intermittence mode control method according to the preferred embodiment of the present invention that will be described later.

The LC resonance circuit 330 is connected to the input-side switching unit 320, causes the spherical wave pulse voltage generated by the switching devices Q1 and Q4 of the input-side switching unit 320 to pass, and controls the primary voltage of the transformer 340 by means of LC resonance. That is, the LC resonance circuit 330 adjusts the switching frequency by means of a PFM scheme, controls resonance current $I_r$ and resonance voltage $V_r$, and thus adjusts the secondary voltage of the transformer 340. Further, in the present invention, the LC resonance circuit is comprised of a resonance inductor 332 and a resonance capacitor 334, which are connected in series with the primary winding of the transformer 340. However, the present invention is not limited to this construction.

The transformer 340 converts the primary voltage, i.e. the resonance voltage transferred from the LC resonance circuit 330, to secondary voltage according to a turn ratio, and transfers the secondary voltage to the output-side switching unit 360. That is, the transformer 340 converts the input voltage to the voltage of a predetermined level.

The gate driving circuit 350 detects the polarity of secondary current $I_o$ flowing in the secondary winding of the transformer 340, and controls the output-side switching unit 360 according to the detected polarity. That is, the gate driving circuit 350 automatically turns on or off the switching device Q11, Q12, Q13 or Q14 of the output-side switching unit 360 according to the polarity of the secondary current $I_o$, instead of turning on or off the switching device Q11, Q12, Q13 or Q14 by an external operation as the gate driving circuit (not shown) of the input-side switching unit 320. This will be described in detail with reference to FIG. 4.

The output-side switching unit 360 converts the secondary voltage of the transformer 340 to DC voltage. That is, the output-side switching unit 360 rectifies the AC voltage to the DC voltage while the switching devices Q11 and Q14 and the switching devices Q12 and Q13 are periodically turned on or off under the control of the gate driving circuit 350. Specifically, in the preferred embodiment of the present invention, a reverse conductive Metal-Oxide Semiconductor Field Effect Transistor (hereinafter, referred to as MOSFET) is used as the switching device Q11, Q12, Q13 or Q14, instead of a general diode rectifier.

That is, the synchronous rectifier type SRC for improving the conversion efficiency of an SRC according to the preferred embodiment of the present invention employs the reverse conductive MOSFET as a rectifier, instead of a general diode rectifier, so that it is possible to reduce the conduction loss of a rectifier by using the fact that the MOSFET shows the characteristic of a reverse conductive resistor $R_{dson}$ if the MOSFET is turned on. For example, if electric current of 10 A flows through a general silicon diode, voltage drop of about 1V occurs, and thus conduction loss of about 10 W (=10 A×1V) occurs. If electric current of 10 A flows through a Schottky diode, voltage drop of about 0.4V occurs, and thus conduction loss of about 4 W (=10 A×0.4V) occurs. However, if synchronous rectification is performed for the MOSFET, reverse conductive resistance of which is 0.01Ω, conduction loss of 1 W (=10 A×10 A×0.01Ω) occurs. Accordingly, it is possible to effectively reduce conduction loss as compared to the case of using the conventional silicon diode.

As described above, in the output-side switching unit 360, output-side Schottky diodes D11 to D14 are connected in parallel with the switching devices Q11 to Q14, respectively. The reason for respectively connecting the output-side Schottky diodes D11 to D14 to the switching devices Q11 to Q14 as illustrated in FIG. 3 is for preventing the body diodes embedded in the switching devices from being turned on when the switching devices are turned off before the resonance current $I_r$, which is the secondary current of the transformer 340, becomes zero.

In FIG. 3, the input-side Schottky diodes are connected to each switching device of the input-side switching unit 320. However, this is for convenience of description. Actually, the input-side Schottky diodes are embedded in the switching devices, respectively. Further, the output-side Schottky diodes are respectively connected in parallel with the switching devices of the output-side switching unit 360. Actually, each of the switching devices includes each of the output-side Schottky diodes therein as in the case of the switching device in the input-side switching unit 320, and the Schottky diodes are respectively connected in parallel with the switching devices in order to reduce reverse recovery time as described later.

As described above, the body diode of the MOSFET used as the switching device has low reverse conduction loss as compared to the conventional diode switching device, but has long reverse recovery time. Accordingly, it is apparent that rectification loss due to the long reverse recovery time is loss that cannot be passed over. In the meantime, when the Schottky diode is turned on, forward voltage drop is less than that of the body diode in the MOSFET.

According to the preferred embodiment of the present invention, if the Schottky diode is connected in parallel with the MOSFET that is the switching device, the secondary current of the transformer 140 flows through the Schottky diode, instead of the body diode in the MOSFET, when the MOSFET is turned off. Herein, since the Schottky diode has reverse recovery time approximating zero, rectification loss can be reduced.

The output capacitor 370 performs filtering for smoothing the output voltage of the output-side switching unit 360, and transfers the filtered voltage to the output terminal 380. In FIG. 3, the capacitor $C_o$ is connected, but the present invention is not limited to this construction.

The output terminal 380 is connected to a load, and outputs load voltage. In FIG. 3, the resistor $R_o$ is connected, but the present invention is not limited to this construction.

The synchronous rectifier type SRC according to the preferred embodiment of the present invention includes the gate driving circuit 350 as described above.

Figure 4:
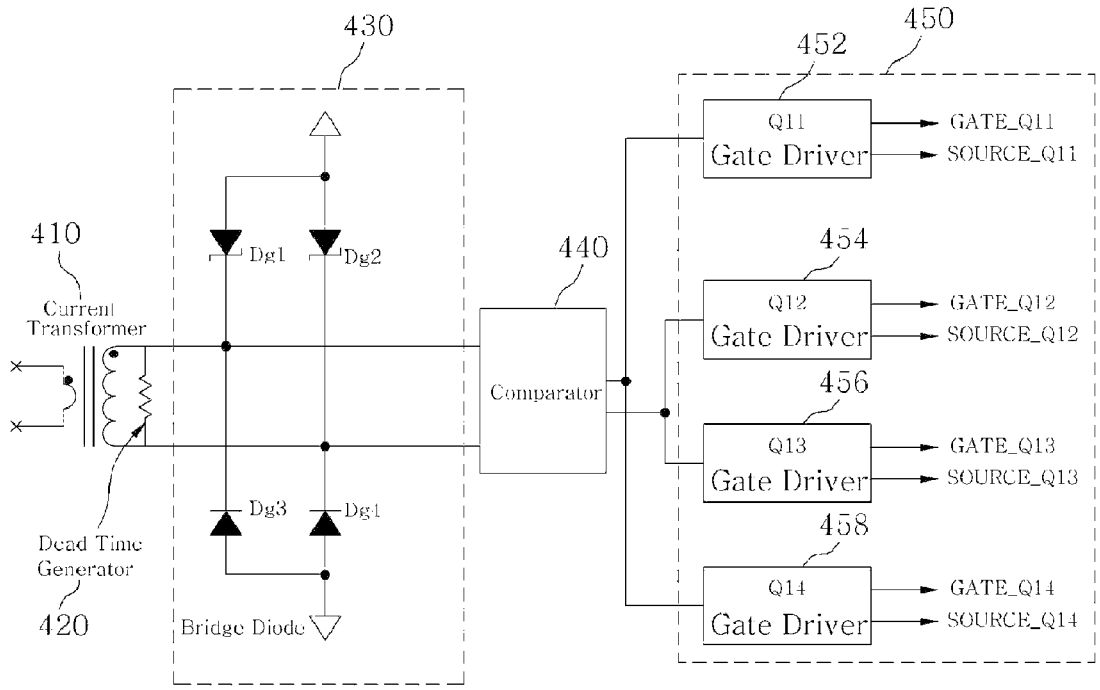
FIG. 4 is a circuit diagram schematically illustrating a gate driving circuit according to a preferred embodiment of the present invention.
Figure 4:
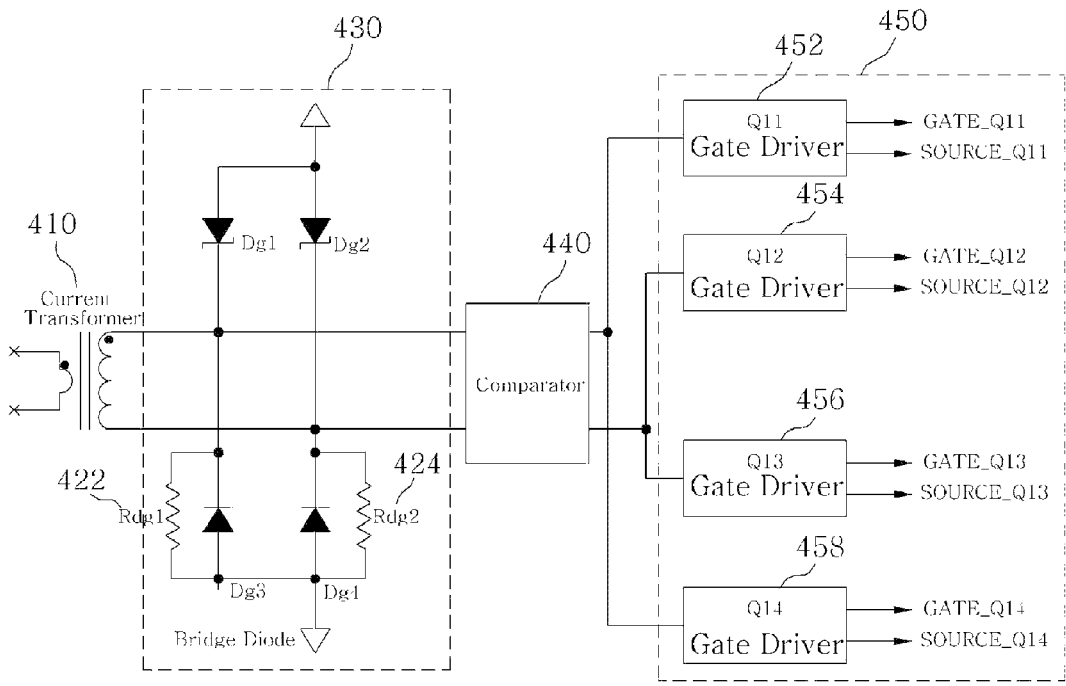

FIG. 4 is a circuit diagram schematically illustrating the gate driving circuit according to the preferred embodiment of the present invention.

As illustrated in FIG. 4, the gate driving circuit 350 is connected to both the secondary winding of the transformer 340 in the synchronous rectifier type SRC and the gates and sources of the switching devices Q11 to Q14 in the output-side switching unit 360, and controls the operations of each of the switching devices Q11 to Q14.

The gate driving circuit 350 according to the preferred embodiment of the present invention includes a Current Transformer (CT) 410, a dead time generator 420, a bridge diode 430, a comparator 440 and a gate driver 450.

The primary winding of the current transformer 410 is connected to the secondary winding of the transformer 340, and converts the secondary current $I_o$ of the transformer 340 to electric current of a predetermined level according to the turn ratio of the current transformer 410. The secondary winding of the current transformer 410 is connected to both the four diodes Dg1 to Dg4 of the bridge diode 430 and the comparator 440, and converts the converted current to the bridge diode 430 and the comparator 440. That is, the current transformer 410 converts the secondary current $I_o$ of the transformer 340 to electric current suitable for being used by the bridge diode 430, the comparator 440 and the gate driver 450, and transfers the converted current to the bridge diode 430 and the comparator 440.

The dead time generator 420 is a resistor, is connected in parallel with the secondary winding of the current transformer 410, and reduces voltage transferred to the bridge diode 430, thereby adjusting input voltage of each diode in the bridge diode 430, which are turned on or off by itself, according to the polarity of the secondary current of the current transformer 410.

That is, voltage inputted to the bridge diode 430 is reduced according to the resistance value of the dead time generator 420, and thus each of the diodes Dg1 to Dg4 in the bridge diode 430 is alternatively turned on according to the polarity of input voltage, which is greater than the threshold voltage of the comparator 440, so that electric current flows in the secondary winding of the current transformer 410.

Accordingly, only when the secondary current $I_o$ of the transformer 340, i.e. the primary current of the current transformer 410, has an absolute value of more than a predetermined level from zero, the secondary current of the current transformer 410 based on its turn ratio applies voltage of more than threshold voltage to each of the diodes Dg1 to Dg4 in the bridge diode 430. As a result, it is possible to prevent both the switching devices Q11 and Q14 and the switching devices Q12 and Q13 in the output-side switching unit 360 from being simultaneously turned on. That is, it is possible to generate dead time at which both the switching devices Q11 and Q14 and the switching devices Q12 and Q13 are simultaneously turned off.

In the conventional synchronous rectifier type SRC, a complicated circuit for generating dead time must be separately embedded in the gate driver 450. However, in the present invention, a resistor $R_g$ is connected in parallel with the secondary-side of the current transformer in order to generate dead time, so that it is possible to simplify the construction of a gate driving circuit (i.e. the gate driving circuit 350) for driving the output-side switching unit 360. Consequently, it is possible to obtain the effect of cost reduction.

The dead time generator 420 according to the preferred embodiment of the present invention may also be realized by directly connecting a resistor $R_{dg}$ in parallel with the current transformer 410 as illustrated in FIG. 4a. However, the dead time generator 420 may also be realized by connecting a resistor 422 in parallel with the diode Dg3 and connecting a resistor 424 in parallel with the diode Dg4 as illustrated in FIG. 4b.

In the bridge diode 430, four diodes are connected to the secondary winding of the current transformer 410. That is, the Zener diodes Dg1 and Dg3 are connected to one part of the secondary winding of the current transformer 410, and the diodes Dg2 and Dg4 are connected to the other part of the secondary winding of the current transformer 410. If the voltage having passed through the dead time generator 420 has an absolute value greater than the threshold voltage of the comparator 440, the bridge diode 430 causes the comparator 440 to detect the polarity of the secondary current of the current transformer 410, thereby determining the polarity of the secondary current $I_o$ of the transformer 340.

That is, in a case in which the input voltage is greater than the threshold voltage of the comparator 440, if the input voltage has a positive polarity, the bridge diode 430 causes the switching devices Q11 and Q14 to be turned on. If the input voltage has a negative polarity, the bridge diode 430 causes the switching devices Q12 and Q13 to be turned on. In this way, the comparator 440 operates.

The comparator 440 is connected to both the diodes Dg1 to Dg4 in the bridge diode 430 and the gate driver 450, detects the polarity of the secondary current, and transfers driving signals to the gate driver 450 according to the detected polarity.

That is, the comparator 440 detects the polarity of the secondary current of the current transformer 410. If the secondary current has a positive polarity, the comparator 440 simultaneously transfers driving signals to a Q11 gate driver 452 and a Q14 gate driver 458 in order to turn on the switching devices Q11 and Q14 of the output-side switching unit 360. If the secondary current has a negative polarity, the comparator 440 simultaneously transfers driving signals to a Q12 gate driver 454 and a Q13 gate driver 456 in order to turn on the switching devices Q12 and Q13 of the output-side switching unit 360.

The gate driver 450 includes the Q11 gate driver 452, the Q12 gate driver 454, the Q13 gate driver 456 and the Q14 gate driver 458. The gate drivers 452, 454, 456 and 458 are connected to the comparator 440, are connected to the gates of the switching devices Q11 to Q14 of the output-side switching unit 360, respectively, and receive the driving signals from the comparator 440, thereby turning on or off the switching devices Q11 to Q14 of the output-side switching unit 360 according to the driving signals as described above.

To this end, each of the gate drivers 452, 454, 456 and 458 includes an amplifier in order to generate large gate driving current from the small driving signals received from the comparator 440. Further, each of the gate drivers 452, 454, 456 and 458 includes an isolator for isolating the switching devices Q11 and Q12, and isolating the driving signals when source voltage is different from the ground voltage of a control circuit in the case of the switching devices Q13 and Q14. The conventional gate driver 450 must have a separate dead time generator for generating dead time. However, the gate driver 450 according to the preferred embodiment of the present invention generates dead time through the dead time generator 420 without a separate device for generating the dead time.

Figure 5:
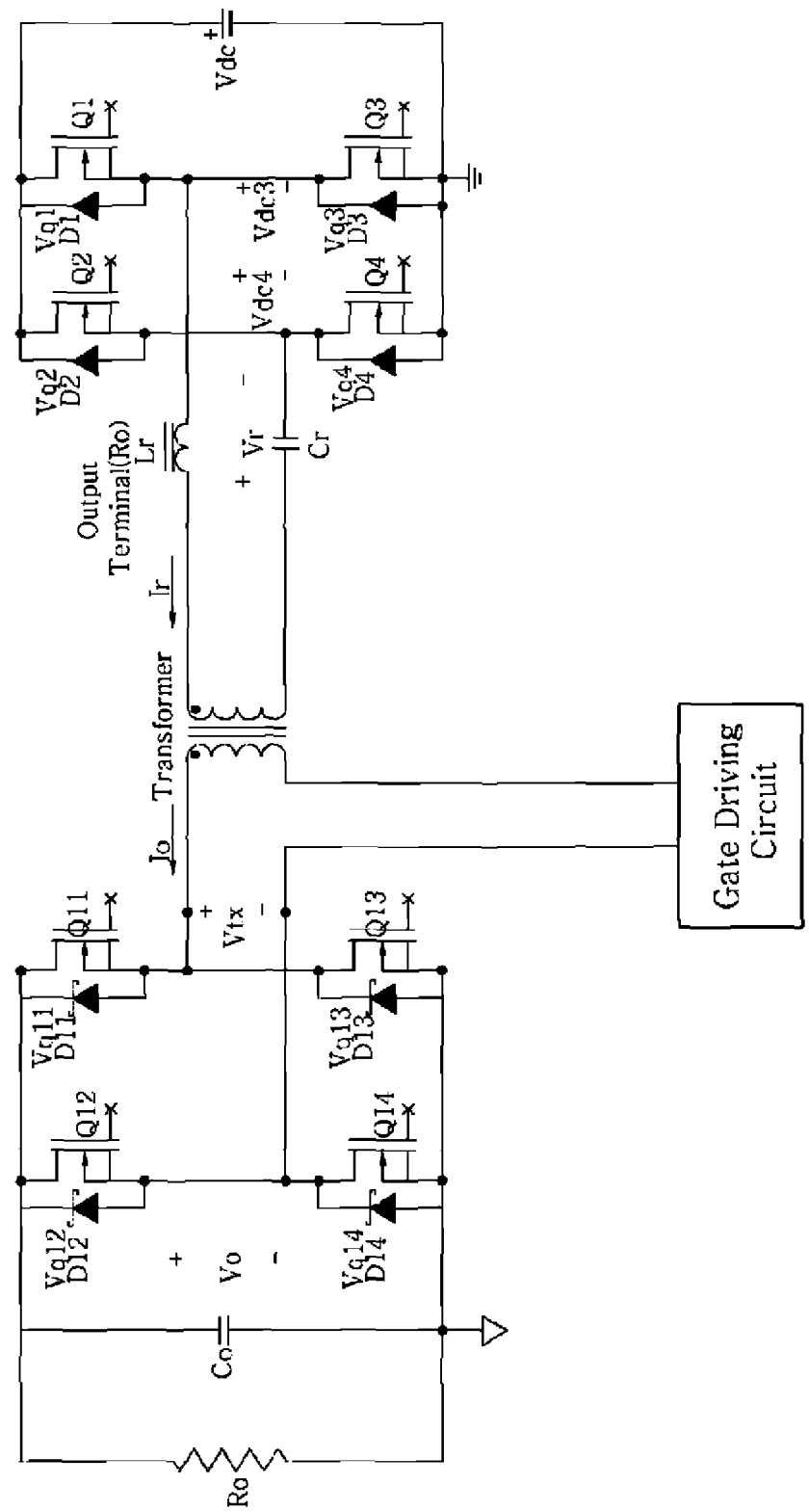
FIG. 5 is a circuit diagram illustrating an operation waveform of a synchronous rectifier type SRC according to a preferred embodiment of the present invention.

FIG. 5 is a circuit diagram illustrating an operation waveform of the synchronous rectifier type SRC according to the preferred embodiment of the present invention.

FIG. 5 illustrates voltage and electric current outputted from main elements of the synchronous rectifier type SRC according to the preferred embodiment of the present invention as shown in FIG. 3. For convenience of description, it is assumed that the input power 310 outputs voltage $V_{dc}$, the gate-source voltage of the switching devices Q1 to Q4 of the input-side switching unit 320 are $V_{q1}$, $V_{q2}$, $V_{q3}$ and $V_{q4}$, respectively, the drain-source voltage of the switching device Q3 is $V_{ds3}$, the drain-source voltage of the switching device Q4 is $V_{ds4}$, the output voltage of the LC resonance circuit 330 is resonance voltage $V_r$, the output current of the LC resonance circuit 330 is resonance current $I_r$, the secondary voltage of the transformer 340 is $V_{tx}$, the secondary current of the transformer 340 is $I_o$, the gate-source voltage of the switching devices Q11 to Q14 of the output-side switching unit 360 are $V_{q11}$, $V_{q12}$, $V_{q13}$ and $V_{q14}$, respectively, and the output voltage of the output-side switching unit 360 is $V_o$.

Figure 6:
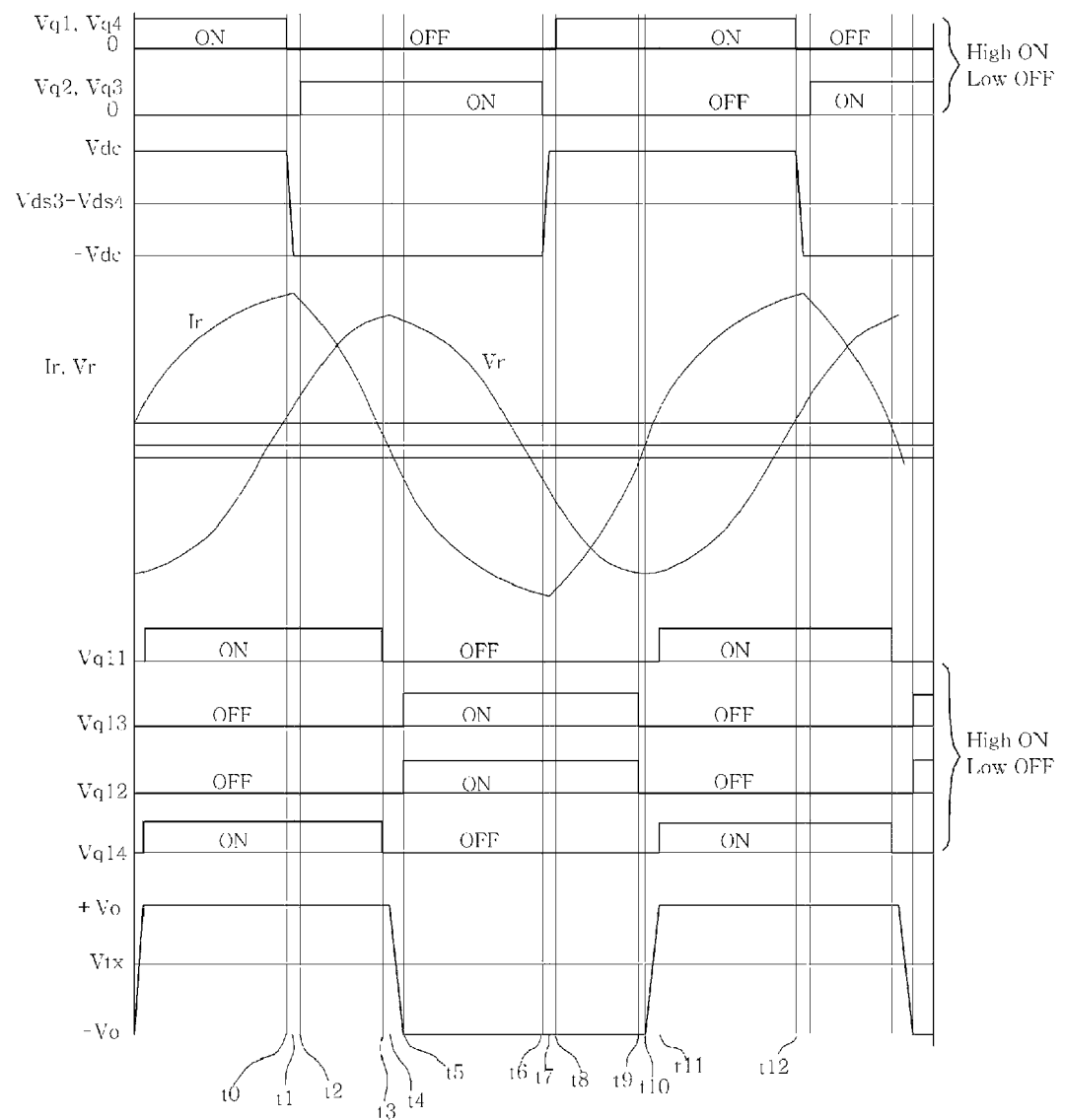
FIG. 6 is a diagram illustrating an operation waveform of a synchronous rectifier type SRC according to a preferred embodiment of the present invention.

FIG. 6 is a diagram illustrating an operation waveform of the synchronous rectifier type SRC according to the preferred embodiment of the present invention.

Hereinafter, the operation of the synchronous rectifier type SRC through output waveforms from the main elements of the synchronous rectifier type SRC according to the preferred embodiment of the present invention will be described with reference to FIGS. 5 and 6.

As illustrated in FIG. 6, the time frame is divided into $t_0$ to $t12$ based on points of time when the input-side switching unit 320 and the output-side switching unit 360 are switched, respectively.

As input power voltage Vdc is applied to the input-side switching unit 320 and thus the switching devices Q1 and Q4 of the input-side switching unit 320 are turned on, $V_{ds3}$ is outputted as $V_{dc}$ and $V_{ds4}$ is outputted as 0. At the time point $t_0$, since the resonance current $I_r$ has a positive value, Q11 and Q14 are turned on and $V_o$ is outputted as $V_{tx}$. Herein, if Q1 and Q4 are turned off, $V_{ds3}$ starts to fall and $V_{ds4}$ starts to rise. At the time point $t_1$, $V_{ds3}$ has a value of 0 and $V_{ds4}$ becomes $V_{dc}$.

At the time point $t_1$, the resonance current $I_r$ flows through the input-side body diodes D2 and D3. While the resonance current $I_r$ flows through the input-side body diodes D2 and D3, if the switching devices Q2 and Q3 are turned on, zero voltage switching having switching loss of 0 is achieved (since the conduction voltage of the input-side body diode is sufficiently less than $V_{dc}$, switching loss is regarded as 0).

At the time point $t_2$, if Q2 and Q3 are turned on, since the resonance current $I_r$ has a positive value, Q11 and Q14 remains in a turned-on state. However, as energy stored in the resonance inductor $L_r$ is reduced, the value of the resonance current $I_r$ is reduced. Then, just before the value of the resonance current $I_r$ becomes zero, i.e. at the time point $t_3$, Q11 and Q14 are turned off by the dead time generator 420. That is, since the voltage applied to the bridge diode 430 becomes less than the turn-on threshold voltage of the comparator 440 by the dead time generator 420, the comparator 440 is turned off, and thus Q11 and Q14 are turned off. Herein, the secondary current $I_o$ of the transformer 340 flows through the output-side Schottky diodes D11 and D14 accordingly, and thus zero voltage switching having switching loss of 0 is achieved.

At the time point $t_3$, Q11 and Q14 are turned off, and the resonance current $I_r$ is gradually reduced until it reaches a value of 0. This time point corresponds to the time point $t_4$. Up to this time point, the secondary current $I_o$ of the transformer 340 flows through the output-side Schottky diodes D11 and D14.

If the time point $t_4$ is reached and the resonance current $I_r$ has a value of 0, the resonance current $I_r$ has a negative value. Therefore, the secondary current $I_o$ of the transformer 340 does not flow through the output-side Schottky diodes D11 and D14 of the output-side switching unit 360. Then, if $V_{tx}$ is reduced until it reaches a value of 0, the secondary current $I_o$ of the transformer 340 flows through the output-side Schottky diodes D12 and D13.

While the secondary current $I_o$ of the transformer 340 flows through the output-side Schottky diodes D12 and D13, if the value (negative value) of the resonance current $I_r$ increases and the voltage inputted to the bridge diode 430 becomes greater than the threshold voltage of the comparator 440, the switching devices Q12 and Q13 of the output-side switching unit 360 are turned on. This time corresponds to the time point $t_5$.

At the time point $t_5$, if the switching devices Q12 and Q13 of the output-side switching unit 360 are turned on, $V_{tx}$ is outputted as a value of $-V_o$. While this value is maintained, if the switching devices Q2 and Q3 of the input-side switching unit 320 are turned off at the time point $t_6$, $V_{ds3}$ increases and $V_{ds4}$ decreases because the resonance current $I_r$ has a negative value. Accordingly, at the time point $t_7$, $V_{ds3}$ becomes $V_{dc}$ and $V_{ds4}$ becomes zero.

From the time point $t_7$, the resonance current $I_r$ flows through the input-side body diodes D1 and D4. At the time point $t_7$, if the switching devices Q1 and Q4 of the input-side switching unit 320 are turned on, zero voltage switching is possible. The time point at which the switching devices Q1 and Q4 of the input-side switching unit 320 are turned on corresponds to the time point $t_8$.

From the time points $t_5$ to $t_9$, $V_{tx}$ is outputted as a value of $-V_o$ because the resonance current $I_r$ has a negative value. If the resonance current $I_r$ has a positive value, $V_{tx}$ is outputted as a value of $+V_o$. Herein, if the resonance current $I_r$ approximates zero from the negative value ($t_9$ to $t_{10}$) the switching devices Q12 and Q13 of the output-side switching unit 360 are turned off by the dead time generator 420. If the resonance current $I_r$ increases to a positive value from zero, $V_{tx}$ also increases. If $V_{tx}$ becomes $+V_o$, D11 and D14 are turned on. If the resonance current has a value of more than a predetermined level, the switching devices Q11 and Q14 of the output-side switching unit 360 are turned on by the comparator 440. This time corresponds to the time point $t_{11}$. From this time point, $V_{tx}$ outputs a value of $+V_o$.

While $V_{tx}$ outputs $+V_o$, the switching devices Q1 and Q4 of the input-side switching unit 320 are turned off the time point $t_{12}$. Then, the afore-described processes are repeated, and details will be omitted.

Hereinafter, an intermittence mode control method for controlling the no-load characteristic in the synchronous rectifier type SRC according to the preferred embodiment of the present invention will be described in detail with reference to FIG. 7.

Figure 1:
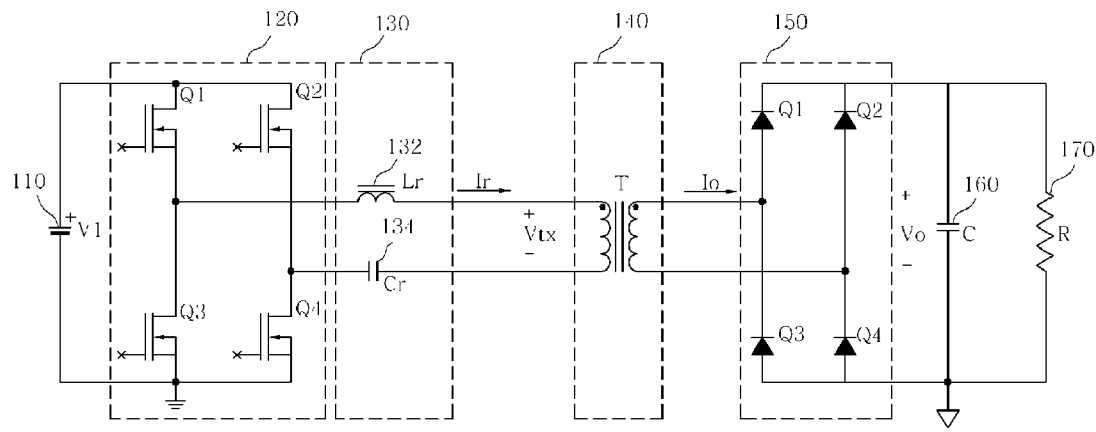
FIG. 1 is a diagram illustrating a conventional SRC and a resonant current characteristic curve.
Figure 1:
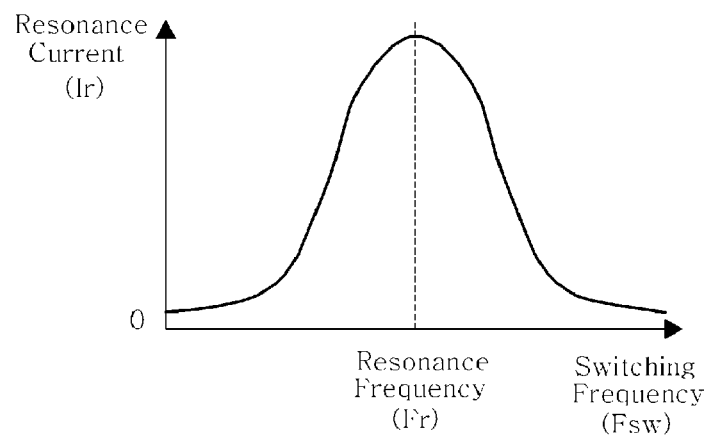

The most general method for controlling the SRC as described in FIG. 1 corresponds to the PFM scheme as described above. However, when the SRC is controlled by the PFM scheme, it is impossible to control the SRC in a no-load state as described above. Of course, if a frequency is allowed to increase, the operation range of electric current is widened. However, since it is very difficult to infinitely increase a switching frequency in the switching device 120, which is a Switch Mode Power Supply (SMPS), and a manufacturing cost also increases considerably, it is impossible to infinitely increase the switching frequency in the switching device 120. In order to solve these problems, the present invention employs an intermittence mode for use.

Figure 7:
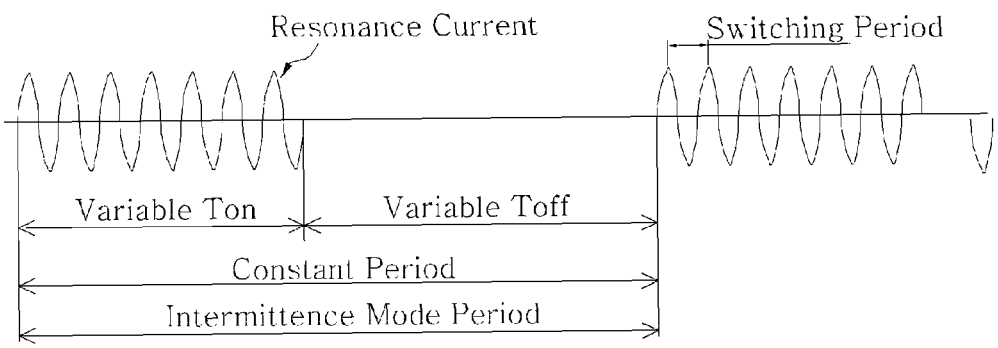
FIG. 7 is a diagram illustrating an operation method of an intermittence mode according to a preferred embodiment of the present invention.
Figure 7:
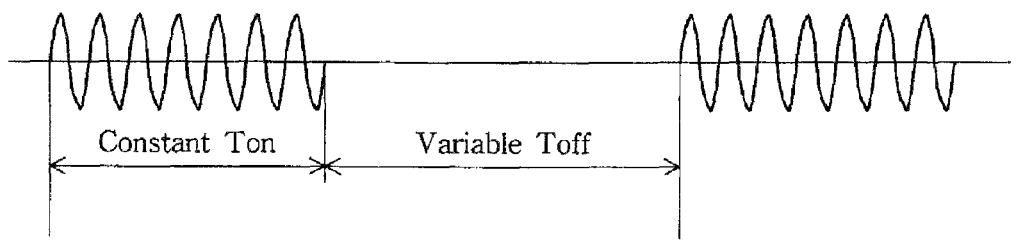
Figure 7:
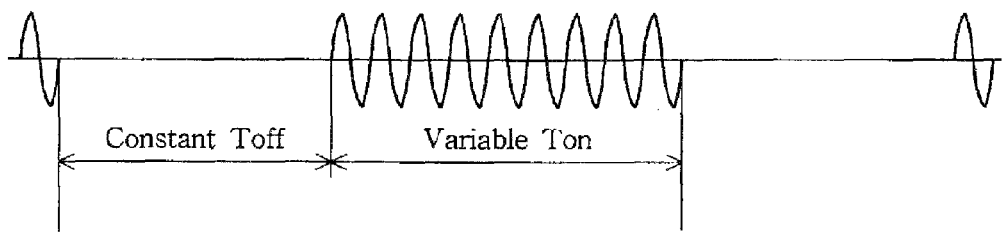
Figure 7:
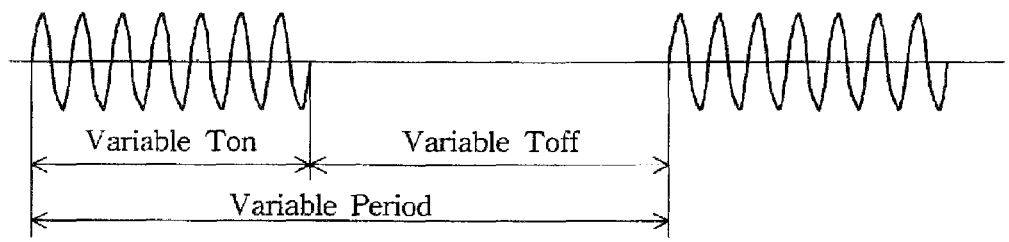

FIG. 7 is a diagram illustrating an operation method of an intermittence mode according to the preferred embodiment of the present invention.

A frequency control method according to the preferred embodiment of the present invention basically uses a PFM scheme. However, in order to accomplish control in a no-load state, an intermittence mode or a hiccup mode has been introduced.

In an intermittence mode, an entire interval is divided into an operation interval and a non-operation interval, and a switching device operates, instead of consequently operating the switching device by changing turn-on time and period of the switching device. For example, if output current corresponds to 20% of maximum current in a maximum operable frequency, the switching device operates with output current, which corresponds to 20% of the maximum current, during 50% of entire time and does not operate during remaining 50% of the entire time in order to reduce the output current to 10% of the maximum current. That is, in order to reduce the output current of the SRC, when the same switching frequency is used, one or more of the turn-on time, the turn-off time and the turn-on period of the switching device are altered, so that the running time of the SRC can be reduced by 50%.

Figure 2:
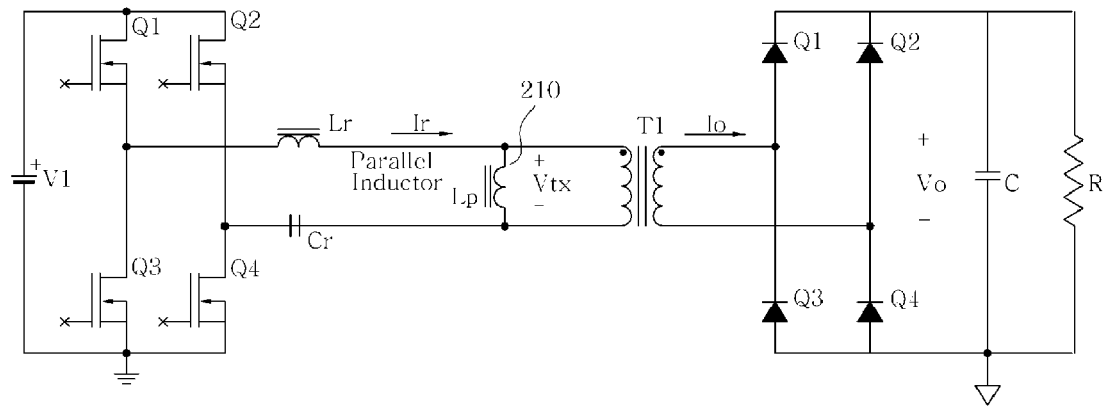
FIG. 2 is a circuit diagram illustrating a conventional LLC SRC and LCC SRC for improving a no-load characteristic.
Figure 2:
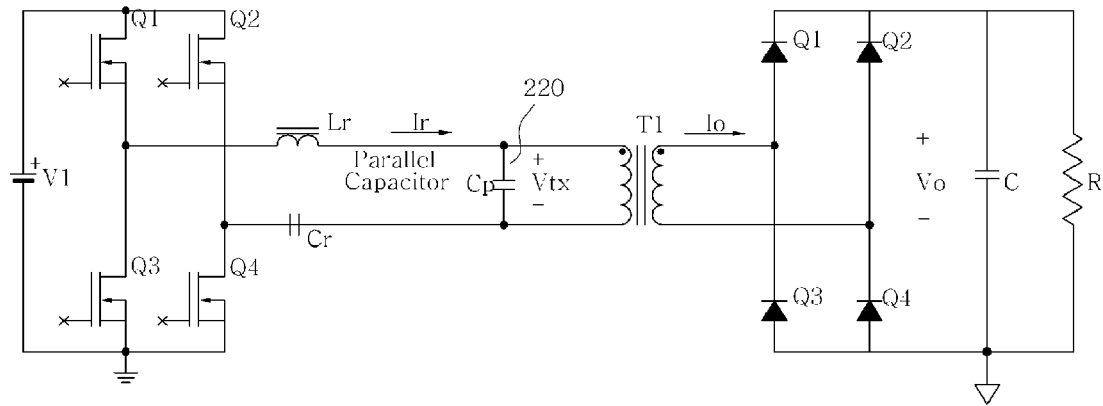

In this way, when the SRC is controlled in the intermittence mode, invalid power flowing in the parallel parts ($L_p$ and $C_p$) of the LLC SRC and the LCC SRC as described in FIG. 2 becomes zero, so that conduction loss can be reduced and thus conversion efficiency can be improved. In addition, the size of the transformer can be reduced and thus a manufacturing cost can be saved.

Such an intermittence mode may be accomplished in various ways as illustrated in FIG. 7. FIG. 7a shows a constant period scheme. In the constant period scheme, the turn-on periods of the switching devices Q1 to Q4 in the input-side switching unit 320 are constantly maintained, and only ratios of turn-on time and turn-off time are altered.

FIG. 7b shows a constant on time scheme. In the constant on time scheme, the turn-on periods and turn-on time of the switching devices Q1 to Q4 in the input-side switching unit 320 are constantly maintained, and the turn-off time is altered.

FIG. 7c shows a constant off time scheme. In the constant off time scheme, the turn-on periods and turn-off time of the switching devices Q1 to Q4 in the input-side switching unit 320 are constantly maintained, and the turn-on time is altered.

FIG. 7d shows a variable period/time scheme. In the variable period/time scheme, all of the turn-on periods, turn-off time and turn-on time of the switching devices Q1 to Q4 in the input-side switching unit 320 are altered.

In the intermittence mode control method according to the preferred embodiment of the present invention, the switching devices Q1 to Q4 in the input-side switching unit 320 are turned on or off by using the constant period scheme, the constant on time scheme, the constant off time scheme or the variable period/time scheme, so that electric current inputted to the LC resonance circuit 330 is controlled to approach zero and the no-load characteristic and light-load characteristic are controlled. Consequently, the intermittence mode control method is used for the conventional SRC as well as the synchronous rectifier type SRC as described in FIGS. 3 to 6, so that the no-load characteristic can be controlled.

INDUSTRIAL APPLICABILITY

According to the present invention, an intermittence mode control method is accomplished only with a simple operation of a switching device. That is, a no-load characteristic can be controlled with an easy scheme and a simple construction by solving disadvantages in that the conventional SRC cannot control the no-load characteristic or a predetermined apparatus has a complicated construction and becomes expensive in order to control the no-load characteristic.

Further, for achieving zero voltage switching, a simple resistor is added to a gate driving circuit for driving a switching device, instead of embedding a separate circuit for generating dead time in the gate driving circuit, so that it is possible to generate the dead time. Consequently, it is possible to simply reduce switching loss that may occur in the zero voltage switching.

The invention claimed is:

1. A synchronous rectifier type Series Resonant Converter (SRC) for converting input DC voltage to output DC voltage having a level different from that of the input DC voltage, the synchronous rectifier type SRC comprising:

an input power for supplying the input DC voltage;

an input-side switching unit for switching four input-side switching devices to convert the input DC voltage to AC voltage, the input-side switching unit being connected to the input power, an LC resonance circuit for storing energy in a resonance inductor and a resonance capacitor by means of LC resonance, and outputting resonance voltage, the LC resonance circuit being connected to the input-side switching unit;

a transformer with a primary winding and a secondary winding for converting the resonance voltage to voltage of a predetermined level according to a turn ratio to generate secondary voltage, and transferring the secondary voltage through the secondary winding, the primary winding being connected to the LC resonance circuit;

an output-side switching unit for switching four output-side switching devices to convert the secondary voltage to the output DC voltage, the output-side switching unit being connected to the secondary winding of the transformer; and a gate driving circuit for detecting a polarity of secondary current flowing in the secondary winding, generating dead time, generating driving signals for driving the output-side switching device of the output-side switching unit based on the polarity and the generated dead time, and then controlling turn-on or turn-off of the output-side switching devices based on the generated driving signals, the gate driving circuit being connected to both the secondary winding of the transformer and the output-side switching unit.

2. The synchronous rectifier type SRC as claimed in claim 1, further comprising:
   an output-side capacitor for filtering the output DC voltage and transferring predetermined voltage obtained by filtering the output DC voltage, the output-side capacitor being connected to the output-side switching unit; and
   an output terminal for outputting the predetermined voltage, the output terminal being connected to the output-side capacitor.

3. The synchronous rectifier type SRC as claimed in claim 1, wherein the input-side switching unit includes the four input-side switching devices connected in a full bridge configuration, and input-side body diodes embedded in each of the input-side switching devices, two input-side switching devices diagonally arranged in the full bridge configuration of the four input-side switching devices are paired, respectively, and the paired switching devices are alternatively switched, whereby the input-side switching unit converts the input DC voltage to the AC voltage.

4. The synchronous rectifier type SRC as claimed in claim 3, wherein the input-side body diodes cause electric current charged in the synchronous rectifier type SRC to flow when the four input-side switching devices are turned off, thereby shortening reverse recovery time.

5. The synchronous rectifier type SRC as claimed in claim 3, wherein the input-side switching unit includes a driving circuit for turning on or off the four input-side switching devices, and the driving circuit turns on or off the four input-side switching devices in an intermittence mode, and causes electric current inputted to the LC resonance circuit to approach zero, thereby controlling output in a no-load characteristic and a light-load characteristic.

6. The synchronous rectifier type SRC as claimed in claim 5, wherein the intermittence mode corresponds to a switching method for operating the four input-side switching devices by changing at least one of turn-on time, turn-off time and turn-on periods of the four input-side switching devices, and includes at least one of a constant period scheme, a constant on time scheme, a constant off time scheme and a variable period/time scheme, the constant period scheme constantly maintaining the turn-on periods of the four input-side switching devices and changing only ratios of the turn-on time and the turn-off time, the constant on time scheme constantly maintaining the turn-on periods and turn-on time of the four input-side switching devices and changing the turn-off time, the constant off time scheme constantly maintaining the turn-on periods and turn-off time of the four input-side switching devices and changing the turn-on time, and the variable period/time scheme changing all of the turn-on periods, turn-off time and turn-on time of the four input-side switching devices.

7. The synchronous rectifier type SRC as claimed in claim 1, wherein the gate driving circuit comprises:
   a current transformer with a primary winding for converting secondary current of the transformer to secondary current with a different level of the current transformer, and transferring the secondary current with the different level to the secondary winding of the transformer, the primary winding being connected to the secondary winding of the transformer;
   a dead time generator for converting the secondary current of the current transformer into voltage, transferring the converted voltage, and thus generating dead time, the dead time generator being connected in parallel with the secondary winding of the current transformer;
   a bridge diode being connected to the dead time generator, the bridge diode having four diodes to which the converted voltage is applied, the four diodes being connected in a full bridge configuration;
   a comparator for detecting the polarity of the secondary current of the current transformer when the bridge diode is turned on and the secondary current of the current transformer flows, determining the polarity of the secondary current of the transformer, and generating and transferring the driving signals according to the polarity, the comparator being connected to the bridge diode; and
   a gate driver for switching the output-side switching devices by using the driving signals received from the comparator, the gate driver being connected to the comparator.

8. The synchronous rectifier type SRC as claimed in claim 1, wherein the output-side switching unit includes the four output-side switching devices connected in a full bridge configuration, and output-side Schottky diodes connected in parallel with the output-side switching devices, respectively, two output-side switching devices diagonally arranged in the full bridge configuration of the four output-side switching devices are paired, respectively, and the paired switching devices are alternatively switched, whereby the output-side switching unit converts the secondary voltage of the transformer to the output DC voltage.

9. The synchronous rectifier type SRC as claimed in claim 8, wherein the output-side Schottky diodes cause electric current charged in the synchronous rectifier type SRC to flow when the four output-side switching devices are turned off, thereby shortening reverse recovery time.

* * * * *